United States Patent
Gao et al.

(10) Patent No.: US 10,438,422 B1
(45) Date of Patent: Oct. 8, 2019

(54) METHODS AND SYSTEMS FOR CONTROLLING USE OF SHARED MACHINES

(71) Applicant: GM GLOBAL TECHNOLOGY OPERATIONS LLC, Detroit, MI (US)

(72) Inventors: Zhen Gao, Shanghai (CN); Chengwu Duan, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/943,330

(22) Filed: Apr. 2, 2018

(51) Int. Cl.
- *G07B 15/06* (2011.01)
- *B60R 25/33* (2013.01)
- *B60R 25/00* (2013.01)

(52) U.S. Cl.
CPC .......... *G07B 15/063* (2013.01); *B60R 25/003* (2013.01); *B60R 25/33* (2013.01); *B60R 2325/205* (2013.01)

(58) Field of Classification Search
CPC ..... G07B 15/063; B60R 25/003; B60R 25/33; B60R 2325/205
See application file for complete search history.

(56) References Cited

U.S. PATENT DOCUMENTS

| | | | |
|---|---|---|---|
| 2015/0371153 A1* | 12/2015 | Lohmeier | G06Q 10/02 705/5 |
| 2016/0318476 A1* | 11/2016 | Cogill | B60R 25/30 |
| 2017/0066464 A1* | 3/2017 | Carter | B60T 7/12 |

OTHER PUBLICATIONS

The Bike-Share Planning Guide, Institute for Transportation & Development Policy, Dec. 5, 2013.

* cited by examiner

*Primary Examiner* — Mohamed Barakat
(74) *Attorney, Agent, or Firm* — Lorenz & Kopf, LLP (57) ABSTRACT

Systems and methods are provided for controlling a shared machine. The shared machine includes a mechanism that allows for an operational function of the shared machine to be controlled via a control system. A server system can process location information that indicates a location of the shared machine to determine whether the location corresponds to a non-permitted area. When the location corresponds to a non-permitted area, a command is generated to automatically place the mechanism in a first state so that the operational function of the shared machine is prevented from being enabled while the shared machine remains in the non-permitted area.

14 Claims, 6 Drawing Sheets

METHODS AND SYSTEMS FOR CONTROLLING USE OF SHARED MACHINES

INTRODUCTION

The present disclosure generally relates to shared machines, and more particularly relates to methods and systems for controlling the use of shared machines to discourage use or parking in non-permitted areas.

Recently, shared vehicle systems have been designed and developed. Examples of vehicles that can be shared by users include bicycles, automobiles, electric scooters, mopeds, motorcycles, etc. These are examples of what can be referred to as shared machines.

For example, bike sharing systems have become increasingly popular in urban communities, college campuses, corporate campuses, and other environments. Bicycle sharing systems can provide users with a low-cost transportation option, and also help alleviate problems related to traffic and pollution. Depending on the system, users are typically charged on a per-use basis, a time-basis, or a distance-use basis. Users can pick a bicycle up at one location and drop it off at another location within a certain geographical area, which makes bike sharing systems convenient for users. Some bike sharing systems require that a shared bicycle be picked up from and returned to a docking station. For instance, docking stations may be strategically located at popular locations, such as train stations, so that commuters can exit the train, pick up a bicycle, ride it to another location such as an office building, and then return the bicycle to another docking station at or near the office building.

The capacity of docking stations can be limited and docking stations may not be always available near a location where a particular user wants to end their trip. To address this issue, other bike sharing systems do not rely on docking stations. In these bike sharing systems, users can pick up and leave the bicycle anywhere that is convenient for the user. For example, the bicycles are provided with remotely operable locking mechanisms such that they may be anchored anywhere. Each bicycle can be equipped with positioning technologies that allow for the location of each bicycle to be tracked via a positioning system such as a Global Positioning System (GPS), cellular or WLAN-based positioning systems, etc. In some cases, these systems can be inconvenient because users can not always rely on a set of fixed locations where they can retrieve a bicycle when they need one. This can also result in a situation where bicycles are left in random locations, which causes inconvenience for not only bike riders, but also other pedestrians and vehicles.

Some users of shared machines (e.g., bicycles or other vehicles) may use or operate them in areas where they are not intended or permitted to be used. For instance, although government rules may exist that prohibit riding or parking shared bicycles in certain areas, it may be difficult to ensure compliance with or enforce such rules especially when there are a large number of shared bicycles in use. Additionally, some users may not park or return the shared machines to a location where they are intended to be stored or docked. It would be desirable to deter users from riding or parking shared bicycles in certain areas. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for controlling a shared machine. In one embodiment, a system is provided that includes a server system associated with a shared machine. In general, the shared machine can be any machine that is shared by two or more users. For instance, the shared machine can be a vehicle such as a bicycle or an automobile such as an autonomous vehicle that is shared by two or more users.

The server system can include one or more processors configured by programming instructions encoded on non-transient computer readable media. When the programming instructions are executed by the one or more processors, the server system can process location information that indicates a location of the shared machine to determine whether the location corresponds to a non-permitted area, and when the location corresponds to the non-permitted area, the server system can generate a command to automatically place a mechanism of the shared machine in a first state so that an operational function of the shared machine is prevented from being enabled while the shared machine remains in the non-permitted area.

In one embodiment, the shared machine includes a control system and a controller. The command causes the controller to generate, in response to the command, a control signal that is provided to the control system. In response, the control system is configured to control an operational function of the mechanism to prevent an operating mode of the shared machine. For example, in one embodiment, the mechanism allows for an operational function of the shared machine to be controlled (e.g., enabled or disabled) via the control system (e.g., until the shared machine is moved from the non-permitted area to a permitted area). For example, in one implementation, the shared machine is a vehicle comprising one or more wheels, and placing the mechanism in the first state allows the one or more wheels to enter a freewheeling mode, or engages a brake, such that the one or more wheels still operate safely but do not operate in a normal manner.

In one embodiment, the system includes a positioning system, such as a Global Navigation Satellite System (GNSS) (e.g., a Global Positioning System (GPS) system or Beidou), that is configured to generate the location information that indicates the location of the shared machine. For instance, the positioning system can continuously determine coordinates of the shared machine based on measurements provided from a positioning receiver that is in communication with the positioning system (e.g., upon receiving an indication that the shared machine has been rented, or unlocked, or has been moved). In one implementation, the location information comprises coordinates of the shared machine. The one or more processors can determine, based on map data from a map service and the coordinates of the shared machine, whether the coordinates of the shared machine correspond to a non-permitted area. When the coordinates of the shared machine are determined to correspond to one of the non-permitted areas, the one or more processors can communicate a message to a user device associated with the shared machine. In one embodiment, the message can indicate that continued presence of the shared machine in the non-permitted area will result in a cost to the user. The "cost to the user" can be anything that can be assessed or applied to the user that would deter the user from continuing to use or place the shared vehicle in non-permitted areas. Cost to the user can vary depending on the implementation. For example, the cost to the user can be a reduced credit score, a monetary penalty, loss of privileges to use the shared machine service, etc.

In one embodiment, the system includes a user device. The user device can be associated with the shared machine (e.g., a user device of a user who is using the shared machine that has an application in communication with the server system). The user device can include an output device. The output device can include a user interface configured to generate a signal when the location corresponds to a non-permitted area. The signal provides an indication that the shared machine is in the non-permitted area and that the shared machine has to be moved from the location into a permitted area before the operational function of the shared machine will be enabled, and additional costs will stop being assessed to the user. The signal can vary depending on the implementation and can include one or more of an audible signal and a visual signal. In one implementation, the visual signal can include a message displayed via a graphical user interface (GUI) at the user device. In some implementations, the visual signal can also include a map displayed via a GUI at the user device, where the map includes the location of the shared machine and a dynamic marking of the non-permitted area displayed in conjunction with the map.

In one embodiment, the one or more processors of the server system can start a usage timer when usage of the shared machine starts and allow the usage timer to continue to run while the location of the shared machine remains in the non-permitted area. The one or more processors of the server system can stop the usage timer when the shared machine is no longer in use and is located in a permitted area. The server system can create a record of an operational violation that indicates that the shared machine is within the non-permitted area. The server system can communicate a message to a communication device of the shared machine, or to a user device associated with the shared machine. The message can indicate that continued presence of the shared machine in the non-permitted area will result in a cost to the user until the shared machine is moved from the non-permitted area to a permitted area.

In another embodiment, a method is provided for controlling a shared machine. The shared machine includes a mechanism that allows for an operational function of the shared machine to be controlled via the control system. In accordance with the method, a server system can process location information that indicates a location of the shared machine to determine whether the location corresponds to a non-permitted area. When the location corresponds to a non-permitted area, a command is generated to automatically place the mechanism in a first state so that the operational function of the shared machine is prevented from being enabled while the shared machine remains in the non-permitted area.

In one embodiment, the shared machine comprises a control system and a controller. In response to the command from the controller, the control system can be actuated to prevent an operating mode of the shared machine (e.g., locking or movement of the shared machine can be prevented).

In one embodiment, the location information comprises coordinates of the shared machine, and the server system can determine, based on map data from a map service and the coordinates of the shared machine, whether the coordinates of the shared machine correspond to a non-permitted area by comparing the coordinates to a plurality of non-permitted areas to determine whether the coordinates are within one of the non-permitted areas. When the coordinates of the shared machine are determined to correspond to one of the non-permitted areas, the server system can communicate a message to a user device associated with the shared machine. The message indicates that continued presence of the shared machine in the non-permitted area will result in a cost to the user. For example, the cost to the user can be a reduced credit score, a monetary penalty, loss of privileges to use the shared machine service, etc.

In one embodiment, when the location corresponds to the non-permitted area, a signal can be presented at a user interface of a user device associated with the shared machine. The signal can provide an indication that the shared machine is in the non-permitted area and that the shared machine has to be moved from the location into a permitted area before the operational function of the shared machine will be enabled.

In another embodiment, a shared machine is provided that includes a mechanism configured to control an operational function of the shared machine, a communication interface, and a processor. The communication interface can receive a command that is generated when a location of the shared machine is determined to correspond to a non-permitted area, and the processor is configured by programming instructions, encoded on non-transient computer readable media, to generate control signals in response to the command. The control signals automatically place the mechanism in a state so that the operational function of the shared machine is prevented from being enabled while the shared machine remains in the non-permitted area.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
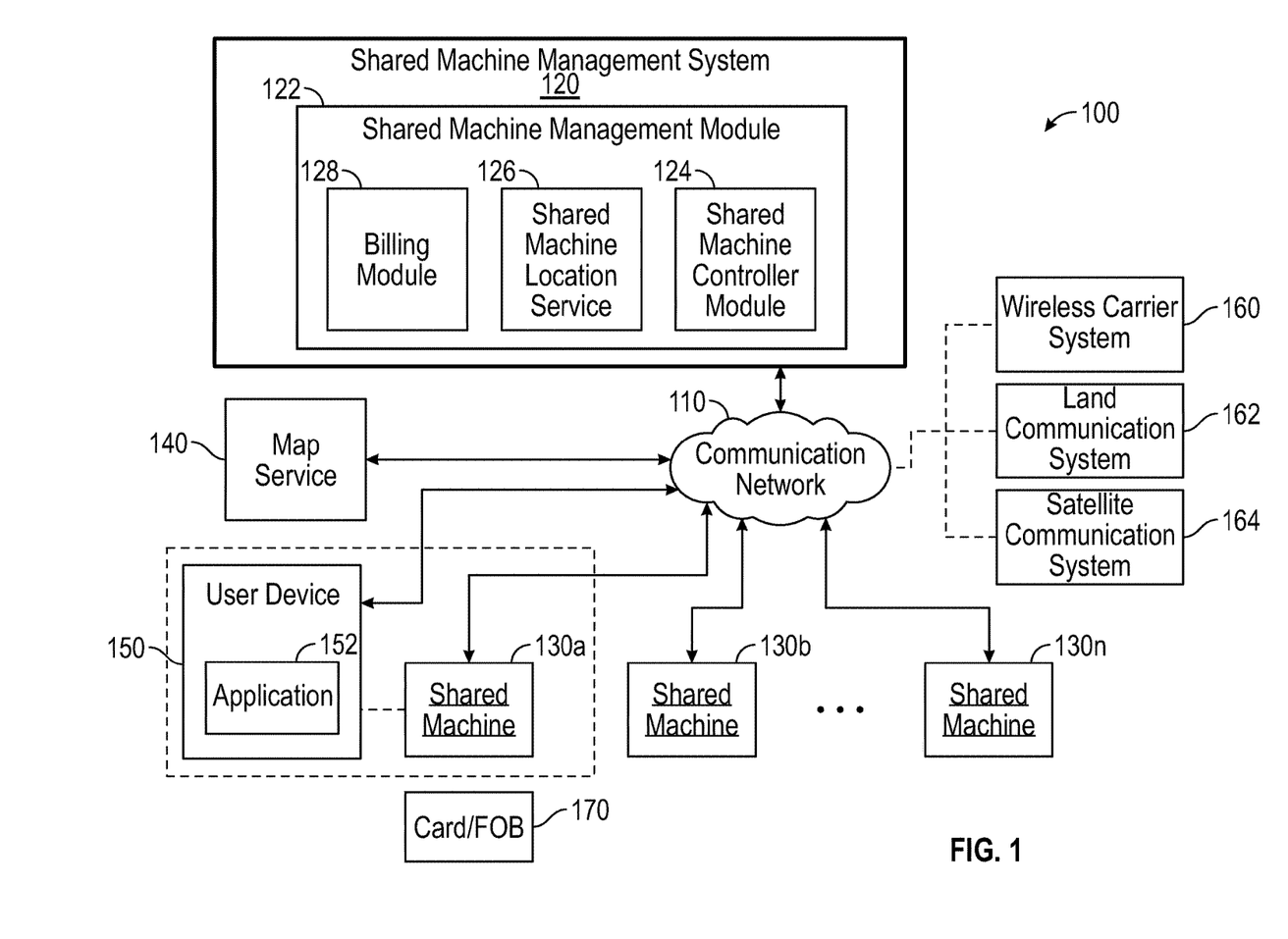
FIG. 1 is a functional block diagram illustrating a shared machine system in accordance with various embodiments.

FIG. 1 illustrates an exemplary embodiment of a system (also referred to as an operating environment) shown generally at 100. The system 100 includes a communication network 110, a server system 120 (also referred to herein as a shared machine management system 120) that is associated with a number of shared machines 130a . . . n, a map service 140, a user device 150 that is associated with a user of one of the shared machines 130a, a wireless carrier system 160, a land communication system 162, and a satellite communication system 164, and a device 170 (e.g., fob or smartcard).

In various embodiments, shared machines 130, such as shared bicycles or shared vehicles may be suitable for use in the context of a system in a certain geographical area (e.g., a city, a school or business campus, a shopping center, an amusement park, an event center, or the like) or may simply be managed by a remote system. It should be appreciated that the system 100 can include any number of shared machines as part of the system. In general, the shared machine can be any type of machine that is shared by two or more users. A shared machine can be owned by an individual and leased or rented, can be owned by a group of individuals and leased or rented, or can be owned by a corporate or government entity and leased or rented. A shared machine can be used any individual who qualifies for access privileges required to gain access to the shared machine. The user's possession, control and use of a shared machine can be limited. For instance, the user of a shared machine has limited possession or usage over with or without presence of a controlling entity or person. Certain functionality of a shared machine can be enabled or disable while a user is in possession of the shared machine. A user's knowledge of rules concerning the use of a shared machine can be limited. The user may or may not have a full understanding of the rules concerning the usage of a shared machine. For instance, the shared machine 130 can be a vehicle such as a bicycle or an automobile such as an autonomous vehicle that is shared by two or more users. As will be explained in greater detail below with reference to FIG. 2, each shared machine 130 can include one or more control systems and various mechanisms (e.g., actuators, brakes, gears, etc.) that allow for operational functions of the shared machine 130 to be controlled (e.g., enabled or disabled) via the control system(s) in response to commands from a shared machine controller module. Other examples of shared machines can include, for example, vehicle chargers, and portable electronic devices (e.g., smartphones).

The communication network 110 supports communication as needed between devices, systems, and components supported by the operating environment 100 (e.g., via tangible communication links and/or wireless communication links). For example, the communication network 110 can include a wireless carrier system 160 such as a cellular telephone system that includes a plurality of cell towers (not shown), one or more mobile switching centers (MSCs) (not shown), as well as any other networking components required to connect the wireless carrier system 160 with a land communications system. Each cell tower includes sending and receiving antennas and a base station, with the base stations from different cell towers being connected to the MSC either directly or via intermediary equipment such as a base station controller. The wireless carrier system 160 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 160. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 160, a second wireless carrier system in the form of a satellite communication system 164 can be included to provide uni-directional or bi-directional communication with the shared machines 130 and the user device(s) 150. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the shared machines 130 and user device 150 and the station. The satellite telephony can be utilized either in addition to or in lieu of the wireless carrier system 160.

A land communication system 162 may further be included such as a land-based telecommunications network connected to one or more landline telephones and that connects the wireless carrier system 160 to the server system 120. For example, the land communication system 162 may include a public switched telephone network (PSTN) such as that used to provide hardwired telephony, packet-switched data communications, and the Internet infrastructure. One or more segments of the land communication system 162 can be implemented through the use of a standard wired network, a fiber or other optical network, a cable network, power lines, other wireless networks such as wireless local area networks (WLANs), or networks providing broadband wireless access (BWA), or any combination thereof. Furthermore, the server system 120 need not be connected via the land communication system 162, but can include wireless telephony equipment so that it can communicate directly with a wireless network, such as the wireless carrier system 160.

In one embodiment, the user device 150 and shared machines 130 are communicatively coupled to the server system 120 via the communication network 110 and any other intervening systems such as systems 160, 162, 164.

The user device 150, which can also be referred to herein as a user system or mobile communication device, can be associated with a user who is using a particular one of the shared machines, which in FIG. 1, is shared machine 130*a*. The user device 150 can communicate with a computer (not shown) that is part of the shared machine 130*a* and with the server system 120 via the communication network 110. Although only one user device 150 is shown in FIG. 1, embodiments of the operating environment 100 can support any number of user devices 150. Typically, one user device can be associated with each shared machine at any particular time via an application 152 that is in communication with the server system 120 and other modules 122, 124, 126, 128 that are implemented within the server system 120. In this example, the user device 150 of a user who is using the shared machine 130*a* includes an application 152 that is in communication with the server system 120.

Each user device 150 supported by the operating environment 100 may be implemented using any suitable hardware platform. In this regard, the user device 150 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 150 supported by the operating environment 100 is realized as a computer-implemented or computer-based device having the hardware, software, firmware, and/or processing logic needed to carry out the various techniques and methodologies described herein. For example, the user device 150 includes a microprocessor in the form of a programmable device that includes one or more instructions stored in an internal memory structure and applied to receive binary input to create binary output. In some embodiments, the user device 150 includes a positioning module capable of receiving positioning satellite signals and generating positioning coordinates based on those signals. In addition, other communication and positioning technologies can be used in situations where conventional position locationing technologies are unavailable or ineffective. In other embodiments, the user device 150 includes cellular communications functionality such that the device carries out voice and/or data communications over the communication network 110 using one or more cellular communications protocols, as are discussed herein.

The user device 150 can include standard components of any common form factors mentioned above including various output devices. In various embodiments, the user device 150 includes a visual display, such as a touch-screen graphical display, or other display, one or more speakers, etc.

The user device 150 can execute the application 152 that communicates with the server system 120 via communication infrastructure, and the server system 120 can communicate with the application 152 that executes at the user device 150. For example, in one embodiment, the application 152 that executes at the user device 150 can communicate with the server system 120 to provide information about the location and orientation of the shared machine, information about usage of the machine, machine health status regrading components, maintenance, service, battery level, etc., user information that is associated or linked with the user, information that identifies the user, history information regarding the machine and/or its usage, etc. This information allows the server system 120 to stay up-to-date regarding status of each shared machine and users of the shared machine. The server system 120 can communicate messages (or any other information) with the application 152 that executes at the user device 150 and/or with an application that executes at the shared machine. Examples of the messages can include messages that include information about the shared machine and its usage, location, cost of usage, usage cost reduction strategies, nearby services, advertisements (e.g., targeted advertisements or unsolicited advertisements), etc. so that the user of the user device 150 stays up-to-date regarding his/her usage of the shared machine.

When the location of the shared machine 130*a* corresponds to a non-permitted area, the application 152 can cause one or more of the output devices to generate a signal via a corresponding user interface, where the signal provides an indication that the shared machine 130 is in the non-permitted area and that the shared machine 130 has to be moved from the location into a permitted area before certain operational function(s) of the shared machine 130 will be enabled, and additional costs will stop being assessed to the user. The signal can vary depending on the implementation and can include one or more of an audible signal and a visual signal. In one implementation, the visual signal can include a message displayed via a graphical UI at the user device. In some implementations, the visual signal can also include a map displayed via a graphical UI at the user device, where the map includes the location of the shared machine 130 and a dynamic marking of the non-permitted area displayed in conjunction with the map along with other permitted areas that are in the vicinity of the current location of the shared machine 130.

The server system 120 includes one or more backend server systems, which may be cloud-based, network-based, or resident at the particular campus or geographical location serviced by the server system 120. The server system 120 can be manned by a live advisor, or an automated advisor, or a combination of both. The server system 120 can communicate with the user devices 150 and the shared machines 130 to track their locations and usage, perform control functions with respect to the shared machines, and many other functions described in greater detail below. In various embodiments, the server system 120 stores account information such as subscriber authentication information, shared machine identifiers, status of users of the shared machine, profile records, behavioral patterns, information regarding reservations, user information that is associated or linked with the user, information that identifies the user, information about usage of each shared machine, status for each shared machine (e.g., information about the location and orientation of the shared machine used by each user), information about the shared machine and its usage, location, cost of usage), history information regarding each shared machine and/or its usage, etc., location/map related information (+ground truths), high-complaint areas, usage and health conditions for each shared machine (e.g., machine health status regrading components, maintenance, service, battery level, etc.), fleet/machine service history and derived patterns and other pertinent machine management and subscriber information.

In accordance with a typical use case workflow, a registered user of the server system 120 can rent one of the shared machines 130 for use using their user device 150, which can be a smartphone, or using a device 170 that is uniquely associated with that user such as a fob, a smart card, etc. Alternatively, a user rent one of the shared machines 130 for use using static/dynamic authentication technologies, key/PIN/password/passcode, etc., recognition technologies such as facial and/or voice recognition, proximity detection (e.g., car-key-like proximity detection. This is commonly done, for example, when the shared machine is a shared bicycle or vehicle such as a zip car.

In accordance with another typical use case workflow, a registered user of the server system 120 can create a reservation request (also referred to as a ride request herein) via the user device 150. This is commonly done when the shared machine is a shared vehicle that is reserved in advance. In some implementations, the reservation request will typically indicate the passenger's desired pickup location (or current positioning location), the desired destination location (which may identify a predefined vehicle stop and/or a user-specified passenger destination), and a pickup time. In some implementations, the server system 120 receives the reservation request, processes the request, and reserves and/or dispatches a selected one of the shared machines 130 (when and if one is available). If a machine is not available at the time a reservation is made, the system can arrange/schedule for one based on other reservations and usage information for a later time. In a use case where the shared machine is an autonomous vehicle, the server system 120 can dispatch a particular autonomous vehicle to pick up the passenger at the designated pickup location and at the appropriate time. The server system 120 can also generate and send a suitably configured confirmation message or notification to the user device 150, to let the passenger know that a shared machine has been rented, reserved, or is on the way to the passenger.

One or more processors of the server system can start a usage timer when usage of the shared machine 130 starts, and allow the usage timer to continue to run until the shared machine 130 is no longer in use and is located in a permitted area. In addition, the one or more processors of the server system can start other timers when the location of the shared machine enters a non-permitted area. This timer can run and time the duration that the shared machine remains in the non-permitted area. Such timers can continue to run until the shared machine 130 is no longer located in the non-permitted area. In some cases, an accidental pass through a non-permitted area can be disregarded (e.g., when the shared machine is in the non-permitted area for a duration less than a threshold) starts.

As can be appreciated, the subject matter disclosed herein provides certain enhanced features and functionality in addition to what may be considered as a standard or baseline shared machine management system. To this end, any shared machine management system can be modified, enhanced, or otherwise supplemented to provide the additional features described in more detail below.

A processor (not illustrated in FIG. 1) that is associated with the shared machine 130 can process location information to determine whether the location corresponds to a non-permitted area, and when the location corresponds to a non-permitted area, can generate a command to automatically place a mechanism of the shared machine 130 in a first state so that the operational function of the shared machine 130 is prevented from being enabled while the shared machine 130 remains in the non-permitted area. The processor can be part of the shared machine 130 itself, or can be implemented at the server system 120, for example, at the shared machine management module 122.

The server system 120 can include one or more processors configured by programming instructions encoded on non-transient computer readable media. The programming instructions can be organized into different modules including the shared machine management module 122, which can further include a shared machine controller module 124, a shared machine location service 126, and a billing module 128. The shared machine controller module 124 controls various operational mechanisms of the shared machines 130. The shared machine location service 126 monitors the location of the shared machines 130. The billing module 128 monitors the usage of the shared machines 130 and generates billing for the usage of the shared machines 130. In one embodiment, when communication cannot be established, this functionality of the server system can be implemented in an offline mode at the shared machine 130 itself, or at a user device 150 associated with the shared machine.

The server system 120 can also communicate control signals to one or more processor(s) or controller(s) of the shared machine. In response, the one or more controller(s) of the shared machine 130 can generate commands, based on the control signals, and communicate the commands to one or more sub-systems of the shared machine to control operation of those sub-systems or to adjust operation of those sub-systems. Examples of sub-systems that can be controlled or adjusted by the commands can include automatic locks that control access or entry into the shared machine, a clutch of a vehicle, lighting systems, locks for pedals, wheels, or sprockets.

When the programming instructions are executed by the one or more processors, the shared machine location service 126 of the server system 120 can process location information that indicates a location of the shared machine to determine whether the location corresponds to a non-permitted area, and when the location corresponds to the non-permitted area, the shared machine controller module 124 can generate a command to automatically place one or more mechanisms of the shared machine in a state so that an operational function of the shared machine 130 is prevented from being enabled while the shared machine 130 remains in the non-permitted area.

In one embodiment, a positioning system (not illustrated in FIG. 1) that is associated with the shared machine 130 can generate location information that indicates a location of the shared machine 130. The positioning system can be part of the shared machine 130 itself or part of a device, such as user device 150, that is associated with the shared machine 130 via the application 152 at the time it is in use by the user. For example, upon receiving an indication that the shared machine 130 has been rented, or unlocked, or has been moved, the positioning system can continuously determine coordinates of the shared machine 130 based on measurements provided from a positioning receiver that is part of or in communication with the positioning system.

In one embodiment, the one or more processors of the server system 120 can start a usage timer when usage of the shared machine 130 starts. The one or more processors of the server system can stop the usage timer when the shared machine 130 is no longer in use and is located in a permitted area. If the shared machine 130 is no longer in use, but is located in a non-permitted area, the usage timer will continue to run while the location of the shared machine 130 remains in the non-permitted area. In addition, the billing module 128 can create a record of an operational violation that indicates that the shared machine 130 is within the non-permitted area. The billing module 128 can be used to implement any of the timers, such as the usage timer or timer that times duration in a non-permitted area. The billing module 128 can communicate a message to a communication device of the shared machine, or to a user device 150 associated with the shared machine 130, where the message can indicate that continued presence of the shared machine 130 in the non-permitted area will result in a cost to the user until the shared machine 130 is moved from the non-permitted area to a permitted area.

Although not shown in FIG. 1, each shared machine 130 can include an onboard computer, instrumentation and various control systems as will now be described with reference to FIG. 2.

Figure 2:
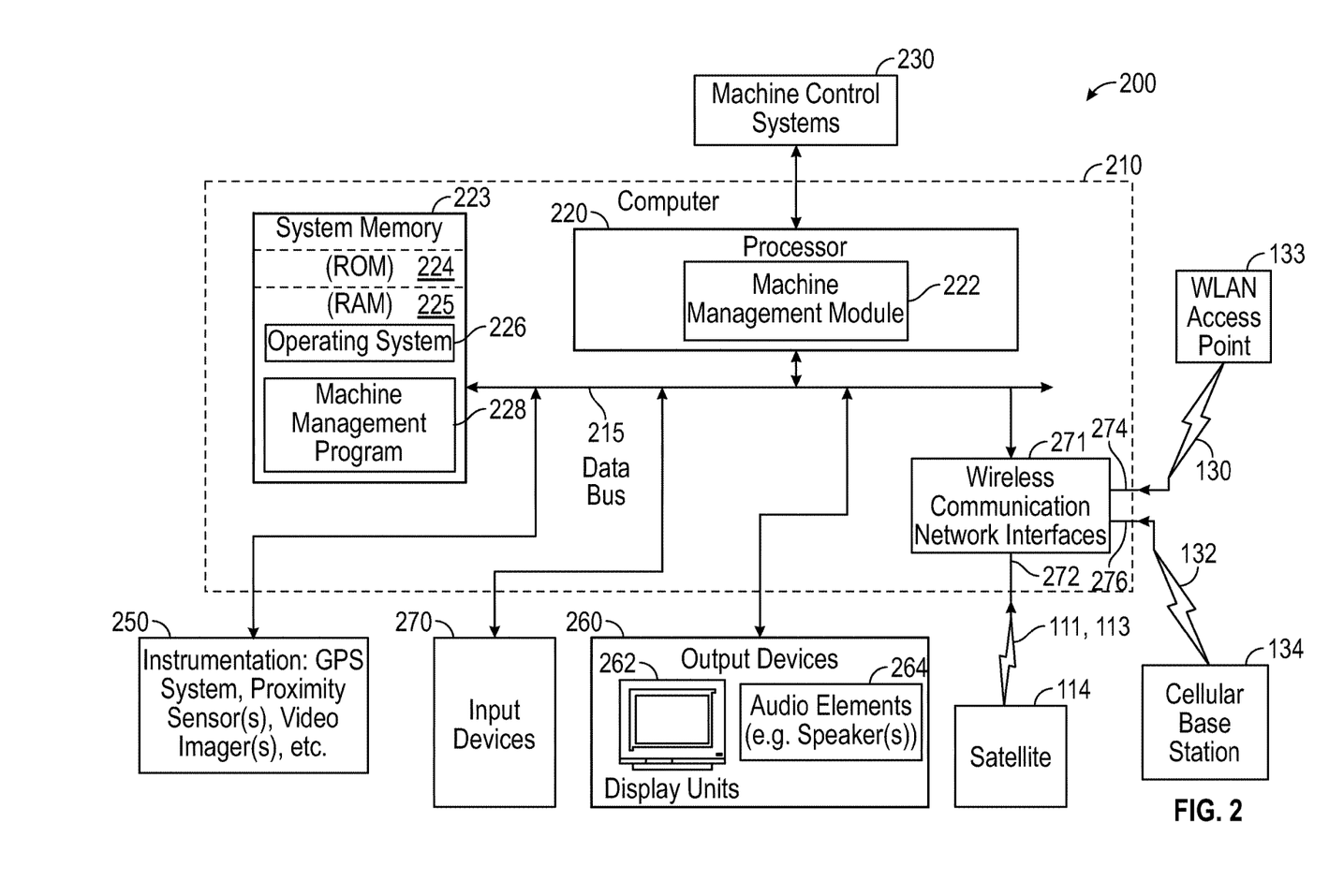
FIG. 2 is a functional block diagram illustrating an onboard computer, instrumentation and various control systems that can be used in conjunction with a shared machine in accordance with various embodiments.

FIG. 2 is a functional block diagram illustrating a system 200 including an onboard computer 210, various machine control systems 230, instrumentation 250, output devices 260, and input devices 270 that can be used in conjunction with a shared machine 130 in accordance with various embodiments. The system 200 also includes various external components such as satellites 114 and the satellite communication system 164 (FIG. 1), the WLAN access point 133 and the land communication system 162 (FIG. 1), and the cellular base station 134 and the wireless carrier system 160 (FIG. 1) that are configured to communicate with the computer 210 via wireless communication network interfaces 271.

The instrumentation 250 can include, for example, the elements of a positioning system such as a Global Position System (GPS), which provides information (e.g., GPS information) regarding the position, orientation, direction, and speed of the shared machine 130, and optional hardware such as proximity sensors, video imagers, etc.

The output devices 260 can include display units 262 and audio elements 264. The display units 262 can be implemented using any man-machine interface, including but not limited to a screen, a display or other user interface (UI). The audio elements 264 can include speakers and circuitry for driving the speakers.

The input devices 270 can generally include, for example, any switch, selection button, keypad, keyboard, pointing devices (such as a cursor controlled device or mouse), one or more touchscreen input devices which can be implemented as part of the display units and/or touch-based input devices including touch screen display(s) which include selection buttons that can be selected using a finger, pen, stylus, etc.

The onboard computer 210 includes a data bus 215, one or more processors that are collectively referred to below as a processor 220 for sake of simplicity, system memory 223, and wireless communication network interfaces 271.

The data bus 215 serves to transmit programs, data, status and other information or signals between the various elements of FIG. 2. The data bus 215 is used to carry information communicated between the processor 220, the system memory 223, the various machine control sub-systems 230, instrumentation 250, output devices 260, various input devices 270, and wireless communication network interfaces 271. The data bus 215 can be implemented using any suitable physical or logical means of connecting the computer 210 to at least the external and internal elements mentioned above.

The processor 220 performs the computation and control functions of the computer system 210 and may comprise any type of processor 220 or multiple processors 220, single integrated circuits such as a microprocessor, or any suitable number of integrated circuit devices and/or circuit boards working in cooperation to accomplish the functions of a processing unit.

It should be understood that the system memory 223 may be a single type of memory component, or it may be composed of many different types of memory components. The system memory 223 can includes non-volatile memory (such as ROM 224, flash memory, etc.), volatile memory (such as RAM 225), or some combination of the two. The RAM 225 can be any type of suitable random access memory (RAM) including the various types of dynamic random access memory (DRAM) such as SDRAM, the various types of static RAM (SRAM). The RAM 225 includes an operating system 226. The system memory 223 can also store executable code for one or more machine management programs 228. The machine management programs 228 that can be loaded and executed at processor 220 to implement a machine management module 222 at processor 220. As will be explained below, the processor 220 executes the machine management programs 228 to measure various types of data and control the shared machine 130.

The wireless communication network interfaces 271 are operatively and communicatively coupled to antennas 272, 274, 276 that are external to the computer 210. The antennas include a satellite antenna 272 that can be used to communicate information with a satellite gateway 114 over a satellite communication link, a WLAN antenna 274 that can be used to communicate information with a WLAN access point 133 over a WLAN communication link, and a cellular network antenna 276 that can be used to communicate information to/from a cellular base station 134 over a cellular communication link. The satellite gateway 114, the WLAN access point 133, and the cellular base station 134 can all be coupled to other networks, including the Internet, so that information can be exchanged with remote computers including the server system 120 and the various modules thereof.

In one embodiment, the positioning system 250 can generate the location information that indicates the location of the shared machine 130. For instance, the positioning system can continuously determine coordinates of the shared machine 130 based on measurements provided from a GPS receiver that is in communication with the GPS system (e.g., upon receiving an indication that the shared machine 130 has been rented, or unlocked, or has been moved). In one implementation, the location information comprises coordinates of the shared machine 130. The shared machine management module 122 of FIG. 1 can determine, based on map data from a map service 140 and the coordinates of the shared machine 130, whether the coordinates of the shared machine 130 correspond to a non-permitted area, and when the coordinates of the shared machine 130 are determined to correspond to one of the non-permitted areas, can communicate a message to the machine management module 222 and/or to a user device 150 associated with the shared machine 130.

The output device 260 can include a user interface configured to generate a signal when the location corresponds to a non-permitted area. The signal provides an indication that the shared machine 130 is in the non-permitted area and that the shared machine 130 has to be moved from the location into a permitted area before the operational function of the shared machine 130 will be enabled, and additional costs will stop being assessed to the user. The signal can vary depending on the implementation and can include one or more of an audible signal and a visual signal. In one implementation, the visual signal can include a message displayed via a GUI. In one embodiment, the message can indicate that continued presence of the shared machine 130 in the non-permitted area will result in a cost to the user. The "cost to the user" can be anything that can be assessed or applied to the user that would deter the user from continuing to use or place the shared vehicle in non-permitted areas, and can vary depending on the implementation. For example, the cost to the user can be a reduced credit score, a monetary penalty, loss of privileges to use the shared machine service, etc. In some implementations, the visual signal can also include a map displayed via a graphical UI, where the map includes the location of the shared machine 130 and a dynamic marking of the non-permitted area displayed in conjunction with the map. The map could also include locations of other permitted areas that are within the vicinity of the current location so that the user has a better idea how to relocate to a permitted area.

In addition, it should also be appreciated that any of the functionality described above as being implemented at an output device 260 of the shared machine 130 could also be implemented at the user device.

In one embodiment, the shared machine includes a machine control system 230. A controller, such as the machine management module 222 that executes at the processor 220, can receive command(s) from the server system to generate, in response to the command(s), one or more control signal(s) that are provided to the control system 230. In response, the control system 230 is configured to control an operational function of one or more mechanism(s) to prevent an operating mode of the shared machine 130 while it remains in one of the non-permitted areas. For example, in one embodiment, the mechanism allows for an operational function of the shared machine 130 to be controlled (e.g., enabled or disabled) via the control system 230 (e.g., until the shared machine 130 is moved from the non-permitted area to a permitted area). For example, in one implementation, the shared machine 130 is a vehicle comprising one or more wheels. The machine control system 230 can be implemented at a controller such as a ECU that applies or disengages the clutch or a brake system, that controls acceleration or speed of the vehicle, that locks or unlocks the vehicle, that controls the controls the transmission, that places a mechanism such as a gear in a state that places the one or more wheels into a freewheeling mode, such that the one or more wheels do not operate in a normal manner, etc., but still operates safely.

Figure 3:
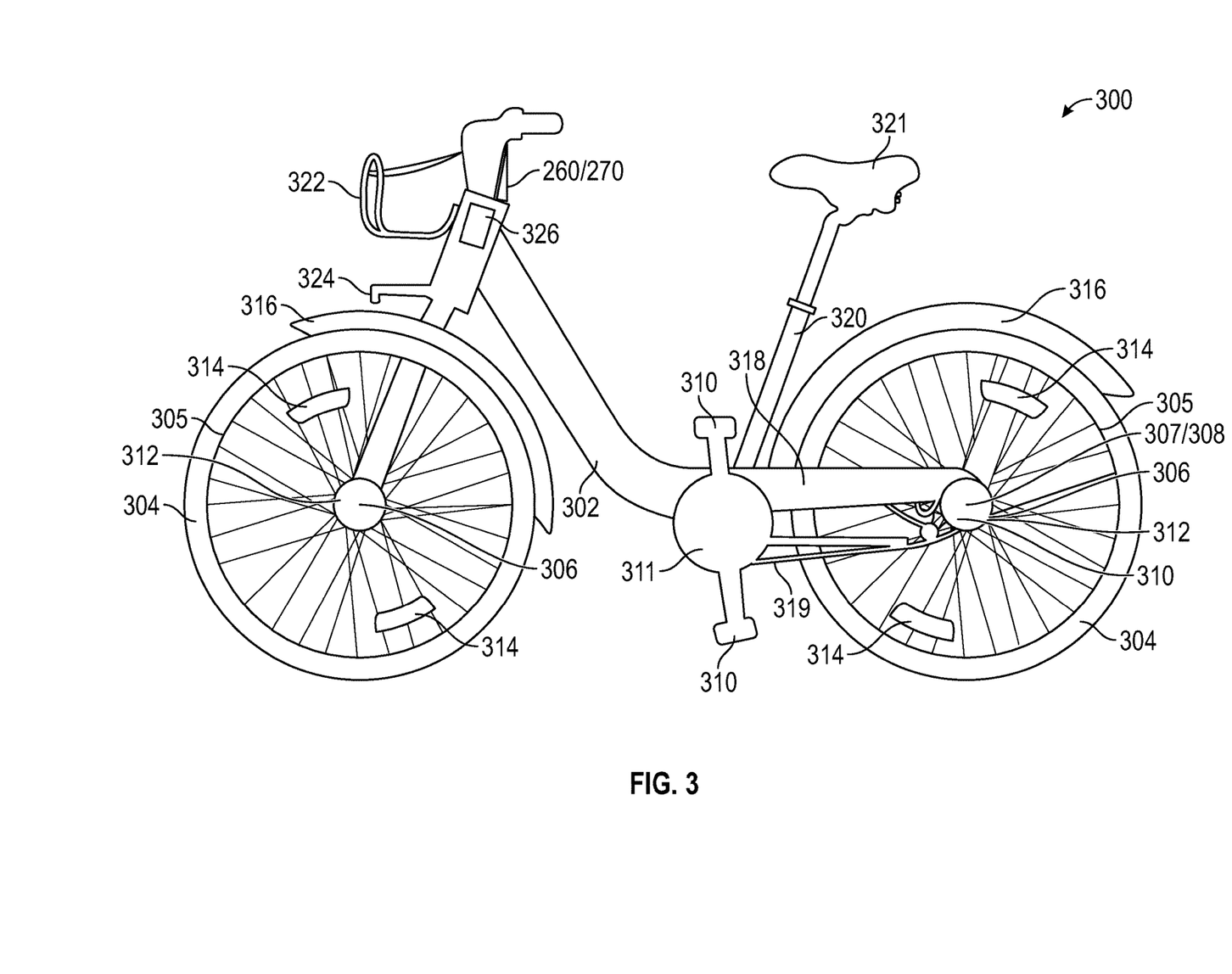
FIG. 3 is a diagram illustrating a shared bicycle in accordance with various embodiments.

FIG. 3 is a diagram illustrating a shared bicycle 300 in accordance with various embodiments. The shared bicycle 300 includes a frame 302, tires 304, rims 305 having spokes, frame hubs 306 that house brakes 307 and gears 308 (and other components as described below), pedals 310, lights 312, reflectors 314, mudguards 316, a chain guard 318, a drive mechanism 319 that propels the tires 304 (e.g., a chain), a seat post 320, a seat 321, a basket 322, a docking mechanism 324, and an on-board computing system 326. Although not illustrated in FIG. 3, the shared bicycle 300 can also include other components. For instance, the shared bicycle 300 can include sensors (e.g., weight/stress sensors on seat/handle bars, motion sensors, etc. to determine active use of machine). The shared bicycle 300 can also include a stand to support the shared bicycle 300.

The frame 302 can vary depending on the implementation, and can be fabricated using various bike frame materials. In this implementation, the frame 302 has a step-through frame design to ensure that the shared bicycle is compatible with all types of clothing. The frame 302 allows for a comfortable upright riding position.

The tires 304 can be made from a solid or puncture resistant material. The tires 304 have a diameter and a profile that is wider than normal (e.g., in comparison to standard 26-inch sized tires). The tire diameter is greater than normal because small tires are prone to getting stuck in potholes. The wider profile helps reduce the frequency of punctures and increases life expectancy. The tires 304 are secured to the frame 302 using non-standard components (e.g., nuts). In general, the shared bicycle can be made from unique parts (e.g., nuts and screws) having sizes to help deter theft. For instance, the nuts and screws that are part of the bicycle 302 can be designed such that they can only be opened with proprietary tools. The design or the rims 305 and the internal spokes can vary depending on the implementation. Various designs can be used.

The frame hubs 306 house the brakes 307 and/or gears 308. The internal hub can keep the wiring for brakes and gears enclosed and hidden. The brakes 307 can include front and rear drum brakes with internal wires. Other types of brakes such as disk, cantilever, and V-brakes may also be used. If the cycle has multiple speeds, the gears 308 can also be housed within the internal hub. When the shared bicycle has multiple gears, the number of gears can vary depending on the implementation.

The pedals 310 connect the rider's foot to a crank 311 allowing the leg to turn the bottom bracket spindle and propel the bicycle's wheels 304 when the pedals 310 are pushed by the rider. The pedals 310 can be implemented using large, flat pedals that are easier for inexperienced riders to use so that they can keep their feet securely on the pedals.

The lights 312 can include front and rear LED lights powered by a hub dynamo. The lights 312 can be included anywhere on the shared bicycle to help provide visibility at night. In addition, reflectors 314 can be provided on wheels, pedals, and both ends of the shared bicycle. In addition, although not shown, the frame color and branding elements on the shared bicycle can be bright and reflective (e.g., a yellow, orange, red, or reflective chrome color) to further improve visibility of the bicycle.

The mudguards 316 are optional. Depending on the implementation, front and rear mudguards can be provided to protect clothing of the rider. The mudguards 316 as well as the frame 302 may also provide advertising space on the bicycle. The chainguard 318 protects the chain from damage and protects the user from contacting the chain 319 while riding. The chainguard 318 can also be used as another type of advertising space.

The seat post 320 can be an adjustable, "quick release" seat post that allows the height of the seat 321 to be adjusted. The quick release feature of the seat post is designed to allow easy height adjustments without making it possible to completely remove the post. A numbering system on the seat post can help frequent users adjust the seat height quickly to the pre-set height that the rider prefers.

The front basket 322 is another optional feature. The front basket 322 allows riders to carry personal items on the bicycle. In one implementation, the front basket 322 is open and porous to prevent water or other fluids from being collected in the basket.

The docking mechanism 324 is optional and can be used when the shared bicycle is of the type that can be docked at a docking station and/or charging station. The docking mechanism 324 allows for the shared bicycle 300 to be held in a fixed position when docked at a docking station. The docking mechanism 324 can include an RFID device or tag (not shown). The RFID device carries the cycle's unique identification number and is read when the cycle is docked at a docking station.

The on-board computing system 326 can be disposed, at least in part, inside the frame 302. This can make it difficult to access unless someone has a tool to unlock the frame and access the on-board computing system 326. Depending on the implementation, the on-board computing system 326 can include some or all of the elements of the onboard computer 210 of FIG. 2. Other elements of FIG. 2 such as the various machine control systems 230 (not shown in FIG. 3) can be part of the on-board computing system 326 or mounted separately within the crankshaft of crank 311, hubs 306 and/or frame 302. Similarly, the different types of instrumentation 250 in FIG. 2 (not shown in FIG. 3) can be part of the on-board computing system 326 or mounted separately within the hubs 306 and/or frame 302. The output devices 260 and input devices 270 of FIG. 2 that can be used in conjunction with a shared machine would be within or on the frame 302 so that they are easily viewable and accessible by the rider.

Figure 4:
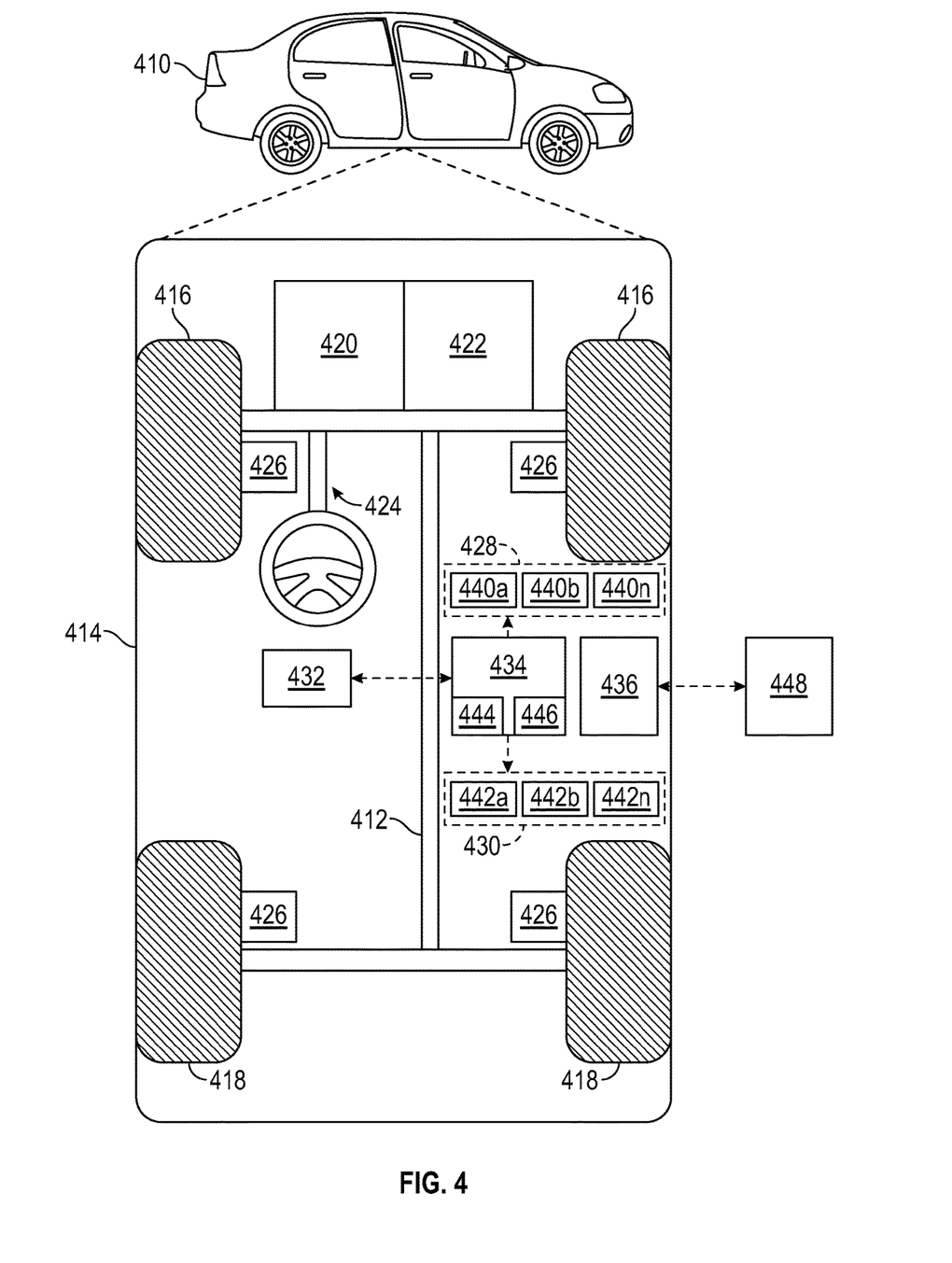
FIG. 4 is a functional block diagram illustrating a vehicle in accordance with various embodiments.

FIG. 4 is a functional block diagram illustrating an example of a vehicle 410 that can be implemented in accordance with various embodiments. As depicted in FIG. 4, the vehicle 410 generally includes a chassis 412, a body 414, front wheels 416, and rear wheels 418. The body 414 is arranged on the chassis 412 and substantially encloses components of the vehicle 410. The body 414 and the chassis 412 may jointly form a frame. The wheels 416-18 are each rotationally coupled to the chassis 412 near a respective corner of the body 414.

The vehicle 410 can be any type of vehicle (e.g., automobile). In accordance with one non-limiting embodiment that will be described with reference to FIG. 4, the vehicle 410 can be an autonomous vehicle. An autonomous vehicle can be, for example, a vehicle that is automatically controlled to carry passengers from one location to another. The vehicle 410 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 410 is a so-called Level One, Level Two, Level Three or Level Four automation system. A Level Four system indicates "high automation," referring to the driving mode-specific performance by an automated driving system of all aspects of the dynamic driving task, even if a human driver does not respond appropriately to a request to intervene. By contrast, a Level Five system indicates "full automation," referring to the full-time performance by an automated driving system of all aspects of the dynamic driving task under all roadway and environmental conditions that can be managed by a human driver. It anticipated that in a Level Five system that other measures could be used to prevent the vehicle from operating or parking in a non-permitted area, and therefore, the disclosed embodiments have less applicability.

As shown, the vehicle 410 generally includes a propulsion system 420, a transmission system 422, a steering system 424, a brake system 426, a sensor system 428, an actuator system 430, at least one data storage device 432, at least one controller 434, and a communication system 436. The propulsion system 420 may, in various embodiments, include an internal combustion engine, an electric machine such as a traction motor, and/or a fuel cell propulsion system. The transmission system 422 is configured to transmit power from the propulsion system 420 to the vehicle wheels 416-418 according to selectable speed ratios. According to various embodiments, the transmission system 422 may include a step-ratio automatic transmission, a continuously-variable transmission, or other appropriate transmission. The brake system 426 is configured to provide braking torque to the vehicle wheels 416-418. The brake system 426 may, in various embodiments, include friction brakes, brake by wire, a regenerative braking system such as an electric machine, and/or other appropriate braking systems. The steering system 424 influences a position of the of the vehicle wheels 416-418. While depicted as including a steering wheel for illustrative purposes, in some embodiments contemplated within the scope of the present disclosure, the steering system 424 may not include a steering wheel.

The sensor system 428 includes one or more sensing devices 440*a*-440*n* that sense observable conditions of the exterior environment and/or the interior environment of the autonomous vehicle 410. The sensing devices 440*a*-440*n* can include, but are not limited to, radars, lidars, positioning systems (e.g., GPS), optical cameras, thermal cameras, ultrasonic sensors, inertial measurement units, and/or other sensors. The actuator system 430 includes one or more actuator devices 442*a*-442*n* that control one or more vehicle features such as, but not limited to, the propulsion system 420, the transmission system 422, the steering system 424, and the brake system 426. The vehicle features can further include interior and/or exterior vehicle features such as, but are not limited to, locks and doors of the vehicle 410, a trunk of the vehicle 410, and cabin features of the vehicle 410.

The communication system 436 is configured to wirelessly communicate information to and from other entities 448, such as but not limited to, other vehicles ("V2V" communication,) infrastructure ("V2I" communication), remote systems, and/or personal devices (described in more detail with regard to FIG. 1). In an exemplary embodiment, the communication system 436 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 432 stores data for use in automatically controlling the autonomous vehicle 410. In various embodiments, the data storage device 432 stores defined maps of the navigable environment. In various embodiments, the defined maps may be predefined by and obtained from a remote system (described in further detail with regard to FIG. 1). For example, the defined maps may be assembled by the remote system and communicated to the autonomous vehicle 410 (wirelessly and/or in a wired manner) and stored in the data storage device 432. As can be appreciated, the data storage device 432 may be part of the controller 434, separate from the controller 434, or part of the controller 434 and part of a separate system. in some embodiments, the maps can include information that indicates which locations correspond to permitted areas of operation, and which locations correspond to non-permitted areas of operation. In some embodiments, information acquired by the sensing devices 440*a*-440*n* can be processed to determine which locations correspond to permitted areas of operation, and which locations correspond to non-permitted areas of operation, and in some cases this information will override information provided with the maps to determine which locations correspond to non-permitted areas of operation.

The controller 434 includes at least one processor 444 and a computer readable storage device or media 446. The processor 444 can be any custom made or commercially available processor, a central processing unit (CPU), a graphics processing unit (GPU), an auxiliary processor among several processors associated with the controller 434, a semiconductor-based microprocessor (in the form of a microchip or chip set), a macroprocessor, any combination thereof, or generally any device for executing instructions. The computer readable storage device or media 446 may include volatile and nonvolatile storage in read-only memory (ROM), random-access memory (RAM), and keep-alive memory (KAM), for example. KAM is a persistent or non-volatile memory that may be used to store various operating variables while the processor 444 is powered down. The computer-readable storage device or media 446 may be implemented using any of a number of types of memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 434 in controlling the autonomous vehicle 410.

The instructions may include one or more separate programs, each of which comprises an ordered listing of executable instructions for implementing logical functions. The instructions, when executed by the processor 444, receive and process signals from the sensor system 428, perform logic, calculations, methods and/or algorithms for automatically controlling the components of the autonomous vehicle 410, and generate control signals to the actuator system 430 to automatically control the components of the autonomous vehicle 410 based on the logic, calculations, methods, and/or algorithms. Although only one controller 434 is shown in FIG. 4, embodiments of the autonomous vehicle 410 can include any number of controllers 434 that communicate over any suitable communication medium or a combination of communication mediums and that cooperate to process the sensor signals, perform logic, calculations, methods, and/or algorithms, and generate control signals and commands to automatically control features of the autonomous vehicle 410.

For example, the controller 434 of the vehicle 410 generates commands based on the control signals to control the brakes, transmission, acceleration, speed of the vehicle 410. The controller 434 implements an autonomous driving system (ADS). That is, suitable software and/or hardware components of the controller 434 (e.g., the processor 444 and the computer-readable storage device 446) are utilized to provide an autonomous driving system that is used in conjunction with vehicle 410.

As will be described below with reference to FIGS. 5 and 6, in some embodiments, each shared vehicle and usage of that shared vehicle by a particular user can be managed and controlled by a server system 120 that can be implemented as a separate backend component, for example, a server or server system, or can be implemented at the server system 120, or alternatively can be implemented, at least in part, at a user device 150 and/or a shared machine 130.

As will be described below with reference to FIGS. 5 and 6, the disclosed embodiments can allow for a shared machine 130 to be controlled when operating or parked in a non-permitted area. The shared machine includes mechanisms that allow for an operational function of the shared machine 130 to be controlled (via machine control systems that are responsible for actuating the mechanisms) to control an operating mode of the shared machine 130 (e.g., to prevent locking or movement of the shared machine). When location information indicates that the shared machine 130 is in a location that corresponds to a non-permitted area, commands can be generated to automatically place the mechanism(s) in certain state(s) so that the operational function(s) of the shared machine 130 are prevented while the shared machine 130 remains in the non-permitted area. When the coordinates of the shared machine 130 are determined to correspond to one of the non-permitted areas, the server system can also communicate a message that indicates that the shared machine 130 is in the non-permitted area, that the shared machine 130 has to be moved from the location into a permitted area before full operational capabilities of the shared machine 130 will be enabled, and/or that continued presence of the shared machine 130 in the non-permitted area will result in a cost to the user.

Figure 5:
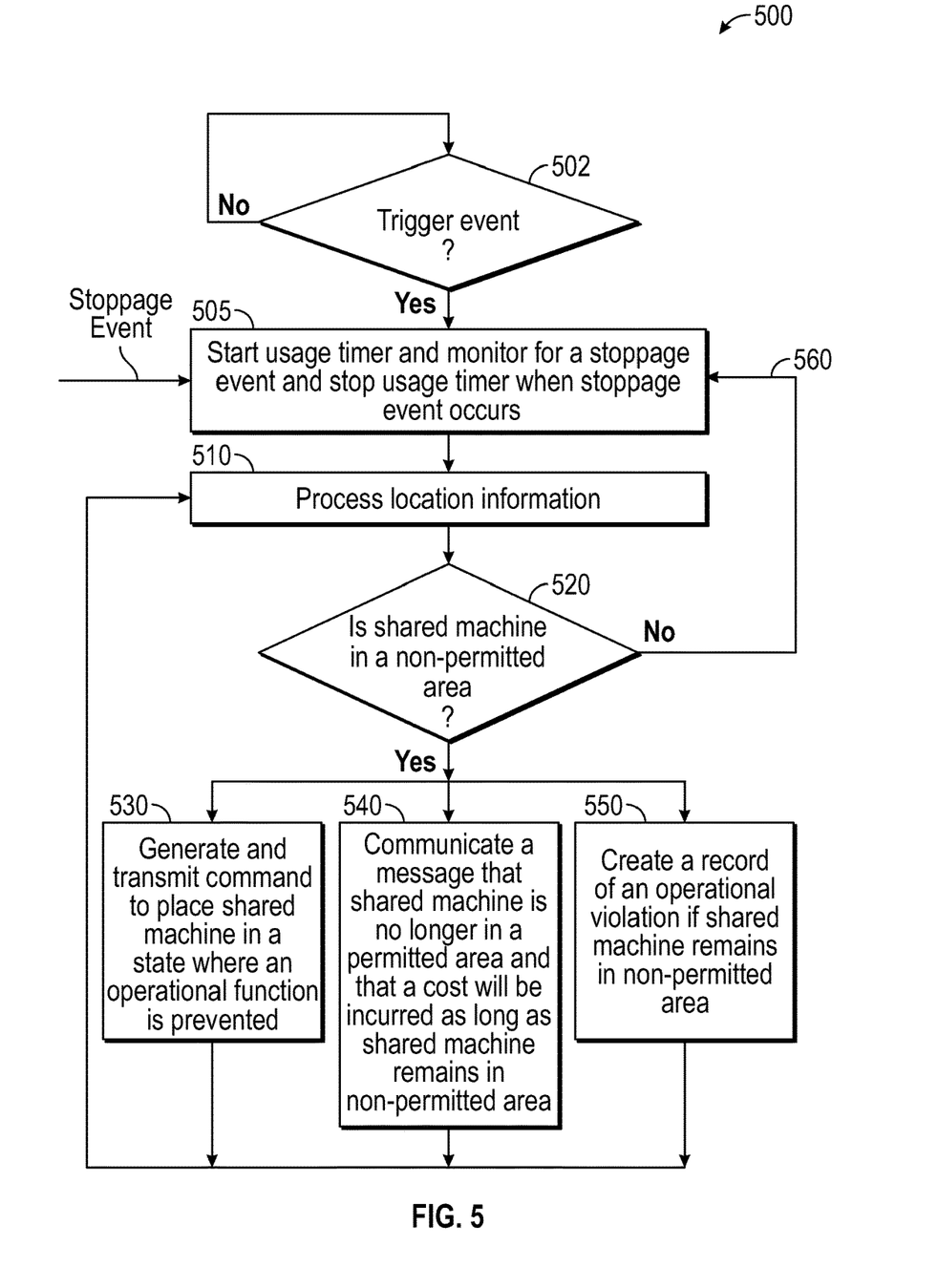
FIG. 5 is a flowchart that illustrates a method in accordance with various embodiments.
Figure 6:
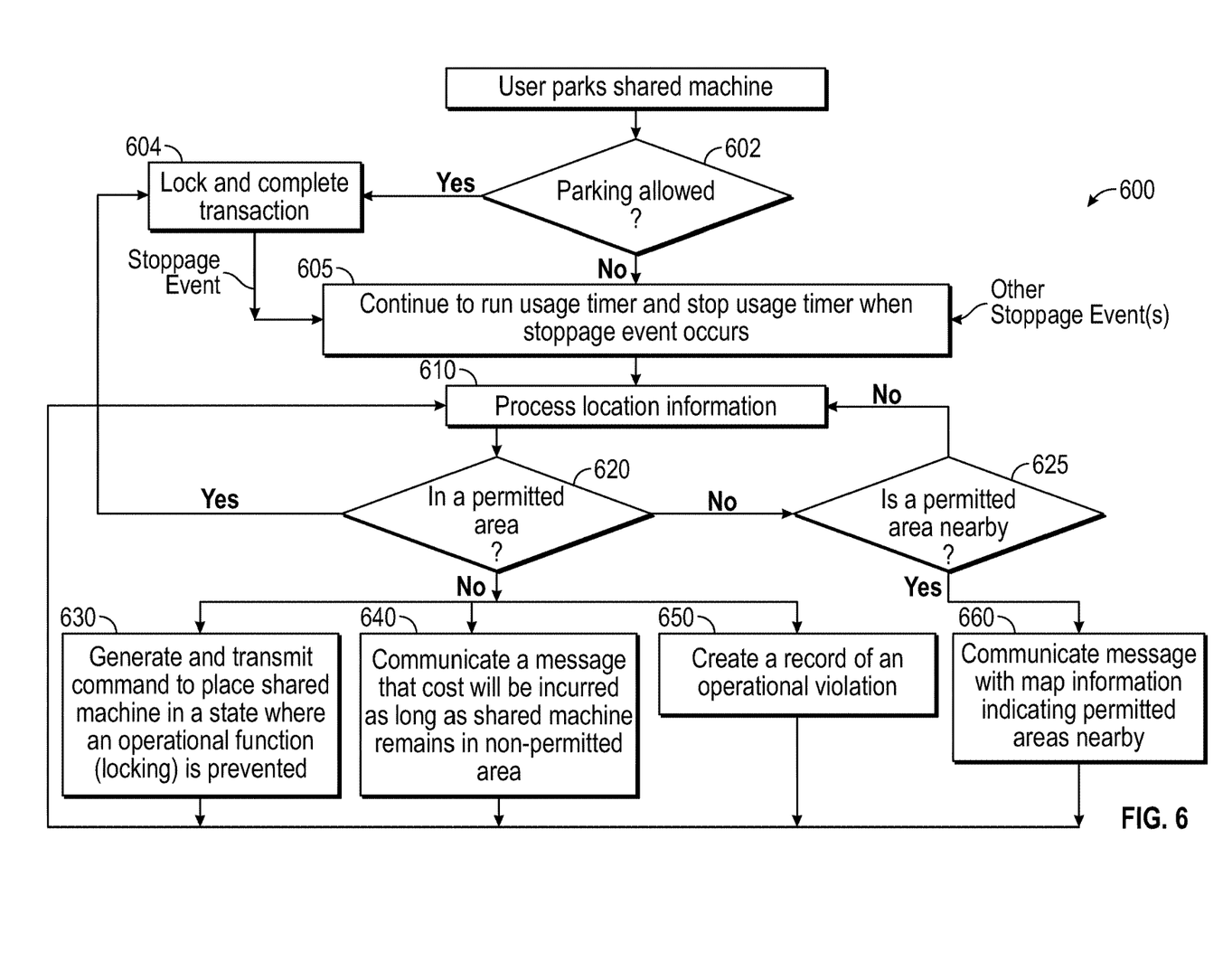
FIG. 6 is a flowchart that illustrates another method in accordance with various embodiments.

FIGS. 5 and 6 are flowcharts that illustrated method in accordance with various embodiments. As a preliminary matter it is noted that FIGS. 5 and 6 will be described with continued reference to FIGS. 1-4. As can be appreciated in light of the disclosure, the order of operation within the methods 500, 600 shown in FIGS. 5 and 6 are not limited as illustrated in FIGS. 5 and 6, but may be performed in one or more varying orders as applicable and in accordance with the present disclosure. In addition, it should be understood that steps of the methods 500 and 600 are not necessarily limiting, and that steps can be added, omitted, and/or performed simultaneously without departing from the scope of the appended claims. It should also be appreciated that the methods 500 and 600 may include any number of additional or alternative tasks, that the tasks shown in FIGS. 5 and 6 need not be performed in the illustrated order, and that the methods 500 and 600 may be incorporated into a more comprehensive procedure or process having additional functionality not described in detail herein. Moreover, one or more of the tasks shown in the methods 500 and 600 could be omitted from an embodiment of the methods 500 and 600 as long as the intended overall functionality remains intact. It should also be understood that the illustrated the methods 500 and 600 can be stopped at any time by a "stoppage event." The methods 500 and 600 are computer-implemented in that various tasks or steps that are performed in connection with the methods 500 and 600 may be performed by software, hardware, firmware, or any combination thereof. In certain embodiments, some or all steps of this process, and/or substantially equivalent steps, are performed by execution of processor-readable instructions stored or included on a processor-readable medium.

FIG. 5 is a flowchart that illustrates a method 500 for alerting a user when a shared machine is operating in a non-permitted area and deterring the user from continuing to operate the shared machine in the non-permitted area in accordance with various embodiments.

At 502, the shared machine management module 122 monitors for the occurrence of a trigger event. The trigger event can be, for example, receiving an indication that the shared machine 130 has been rented, unlocked, or has been moved. The shared machine can be rented, for instance, by a user using a card, fob or an application on a user device or other computer. The monitoring performed at 502 can be a continuous or regular process that executes at a processor of the shared machine and/or the shared machine management module 122, and when the occurrence of a trigger event is detected, it can be reported to the shared machine management module 122.

At 505, upon detecting the occurrence of a trigger event (at 502), the shared machine management module 122 starts a usage timer that will continue to run until a stoppage event occurs, at which point the usage timer stops. The stoppage event (represented by arrow into block 505) can be, for example, receiving an indication that the shared machine 130 has been returned to a permitted storage area such as a docking station, receiving an indication that the shared machine 130 is parked in a permitted area and is no longer in use and/or receiving an indication that the shared machine 130 has been locked. The usage timer continues to run as long as the shared machine 130 is in use or is in a location that is a non-permitted area regardless of whether or not it is in use. At 505, another timer can also be started that times a duration that the location of the shared machine remains in the non-permitted area. In some cases, an accidental pass through a non-permitted area can be disregarded (e.g., when the shared machine is in the non-permitted area for a duration less than a threshold). Although not illustrated in FIG. 5, when the shared machine management module 122 determines that a stoppage event has occurred, the shared machine 130 can be locked and a usage transaction is completed and recorded at the billing module 128. Because the shared machine 130 is no longer in use and is located in a permitted area, the shared machine management module 122 can trigger the stoppage event (as represented by the arrow into block 505) to stop the usage timer.

At 510, the shared machine management module 122 processes location information that indicates the location of the shared machine 130, and then determines at 520, whether the shared machine 130 is located in a permitted area. For example, in one implementation, the location information comprises coordinates of the shared machine 130, and the shared machine location service 126 can determine, based on map data from a map service 140 and the coordinates of the shared machine 130, whether the coordinates of the shared machine 130 correspond to any non-permitted area. This can be done, for instance, by comparing the coordinates to a plurality of non-permitted areas to determine whether the coordinates are within any non-permitted area. The non-permitted areas can be, for example, an unauthorized usage region, a regulated zone, a do-not-enter zone, a no parking zone where parking or storage of the shared machine is prohibited, etc. In one implementation, a positioning system 250 (FIG. 2) generates location information that indicates a location of the shared machine 130, and the location information is provided to the shared machine management module 122 of the server system 120. For example, in one implementation, based on measurements provided from a GPS receiver 271 that is in communication with a positioning system 250, the positioning system can continuously determine coordinates of the shared machine 130 and communicate the coordinates to the shared machine management module 122, which can process the coordinates to determine location of the shared machine and determine (at 520) whether the location of the shared machine corresponds to a non-permitted area.

When it is determined at 520 that the shared machine 130 is located in a permitted area, the method 500 loops at 560, where the shared machine management module 122 can continue to monitor for a stoppage event. Again, the usage timer will continue to run until it is determined that a stoppage event has occurred, at which point the usage timer can be stopped.

When it is determined at 520 that the shared machine 130 is located in a non-permitted area, the method 500 can proceed to 530, 540, and/or 550, where the shared machine management module 122 performs additional tasks, and then loop back to 510 following any one of 530, 540, 550.

At 530, the shared machine management module 122 can generate a command and send it to the shared machine 130 to automatically place a mechanism (associated with the shared machine 130) in a first state so that the operational function of the shared machine 130 is prevented from being enabled while the shared machine 130 remains in the non-permitted area. For example, in one embodiment, the shared machine 130 comprises a control system 230 and a controller, and in response to the command from the controller, the control system 230 can actuate an actuator or other mechanism that allows for an operational function of the shared machine 130 to be controlled (e.g., enabled or disabled) via the control system 230 to prevent an operating mode of the shared machine 130 until the shared machine 130 is moved from the non-permitted area into a permitted area. For example, in one implementation, where the shared machine 130 is a vehicle having one or more wheels, an actuator can control a mechanism (e.g., a lock or a gear or a brake) to place it in a state that allows locking or normal movement of the vehicle to be prevented. For instance, wheels of a bike could be placed in a freewheeling mode such that the one or more wheels do not operate in a normal manner.

At 540, the shared machine management module 122 can generate and communicate a message to a user device 150 of the user and/or to a communication device that is mounted on and associated with the shared machine 130. In one embodiment, the message indicates that continued presence of the shared machine 130 in the non-permitted area will result in a cost to the user until the shared machine 130 is moved from the non-permitted area to a permitted area. Depending on the implementation, the permitted area can be an authorized region, a non-regulated zone, a zone where the shared machine is permitted to be operated or stored, or a parking zone where parking or storage of the shared machine is permitted, etc. The cost to the user could be, for example, that the usage timer will continue to run and accumulate usage fees that will be charged to the user; a reduced credit score credit score; a monetary penalty or fine; and/or loss of future usage privileges of the shared machine service, etc.

For example, in one embodiment, when the location corresponds to the non-permitted area, a communication device can receive a communication that causes a signal to be presented via a user interface of the communication device. For instance, the signal can provide an indication that the shared machine 130 is in the non-permitted area. The signal can be in the form of an audible signal and/or a visual signal. The signal can indicate that the shared machine 130 has to be moved from the location into a permitted area before the operational function of the shared machine 130 will be enabled, and costs will no longer incurred.

At 550, the shared machine management module 122 can create a record of an operational violation that indicates that the shared machine 130 is or has been within the non-permitted area. The record can include the duration of time that the shared machine 130 was left within the non-permitted area, an identifier for the shared machine 130, an identifier for the user and/or account who was using the shared machine.

Following 530, 540, 550, the method 500 loops back to 510 so that the shared machine location service 126 can continue to monitor the location of the shared machine 130.

The disclosed embodiments can help to ensure or create incentives so that users comply with rules regarding permitted use of shared machines and where the shared machines can be operated, etc. The disclosed embodiments can help encourage users to make sure that the shared machine is not operating in non-permitted areas where they are not intended to be used.

FIG. 6 is a flowchart that illustrates another method 600 for alerting a user when a shared machine is parked in a non-permitted area and deterring the user from continuing to park the shared machine in the non-permitted area in accordance with various embodiments.

At 602, the shared machine management module 122 monitors for the occurrence of a trigger event. The trigger event can be, for example, receiving an indication that the shared machine 130 has been parked, locked, or is no longer in use. The monitoring performed at 602 can be a continuous or regular process that executes at a processor of the shared machine and/or the shared machine management module 122, and when the occurrence of a trigger event is detected, it can be reported to the shared machine management module 122. As part of 602, the shared machine management module 122 can then determine whether the shared machine 130 is located in a permitted area where parking is allowed.

When the shared machine management module 122 determines that the shared machine 130 has been parked, locked, or is no longer in use, and is located in a permitted area where parking is allowed, the method 600 proceeds to 604, where the shared machine 130 can be locked and a usage transaction is completed and recorded at the billing module 128. Because the shared machine 130 is no longer in use and is located in a permitted area, the shared machine management module 122 can trigger a stoppage event (as represented by the arrow into block 605) to stop the usage timer. The stoppage event can be, for example, receiving an indication that the shared machine 130 has been returned to a permitted area such as a docking station (e.g., shared machine 130 has been parked in a permitted area).

When the shared machine management module 122 determines that the shared machine 130 has been parked, locked, or is no longer in use, but is located in a non-permitted area where parking is not allowed, the method 600 proceeds to 605, where the shared machine management module 122 allows for a usage timer to continue to run until a stoppage event occurs. The usage timer continues to run as long as the shared machine 130 remains in a location that is a non-permitted area regardless of whether or not it is in use, and stops when a stoppage event occurs, which in this embodiment, can be receiving an indication that the shared machine 130 has been returned to a permitted area such as a docking station (e.g., shared machine 130 has been parked in a permitted area).

At 610, the shared machine management module 122 processes location information that indicates the location of the shared machine 130, and then determines at 620, whether the shared machine 130 has been parked, locked, or is no longer in use, and is located in a permitted area where parking is allowed. As explained above, a positioning system 250 generates location information that indicates a location of the shared machine 130. The location information is provided to the shared machine management module 122 of the server system 120. For example, in one implementation, based on measurements provided from a GPS receiver 271 that is in communication with a GPS system 250, the GPS system can continuously determine coordinates of the shared machine 130 and communicate the coordinates to the shared machine management module 122.

At 620, the shared machine management module 122, processes the location information and determines whether the current location of the shared machine 130, which was determined (at 602) to correspond to a non-permitted area, has changed such that it is now in a permitted area.

When the shared machine management module 122 determines (at 620) that the shared machine 130 has been parked, locked, or is no longer in use, and determines (via the shared machine location service 126) that the shared machine 130 is located in a permitted area where parking is allowed, the method 600 proceeds to 604, where the shared machine 130 can be locked and a usage transaction is completed and recorded at the billing module 128. Because the shared machine 130 is no longer in use and is located in a permitted area, the shared machine management module 122 can trigger a stoppage event (as represented by the arrow into block 605) to stop the usage timer. The stoppage event can be, for example, receiving an indication that the shared machine 130 has been returned to a permitted area such as a docking station (e.g., shared machine 130 has been parked in a permitted area).

When the shared machine management module 122 determines (at 620) that the shared machine 130 has been parked, locked, or is no longer in use, and determines (via the shared machine location service 126) that the current location of the shared machine 130 is still within a non-permitted area where parking is not allowed, the method 600 proceeds to 625, 630, 640, and 650.

At 625, the shared machine location service 126, processes location information and determines whether any permitted areas are nearby the current location of the shared machine 130, which has been determined (at 620) to correspond to a non-permitted area. For example, in one implementation, the location information comprises coordinates of the shared machine 130. The shared machine location service 126 can determine, based on map data from a map service 140 and the coordinates of the shared machine 130, any permitted areas that are nearby the current location of the shared machine 130 (as indicated by the coordinates of the shared machine 130). This can be done, for instance, by comparing the coordinates of the shared machine 130 (that indicate the current location of the shared machine 130) to find coordinates of permitted areas that are within a certain distance threshold distance of the current location of the shared machine. The permitted areas can be, for example, authorized parking or docking regions where parking or storage of the shared machine is allowed or permitted.

When the shared machine location service 126 determines (at 625) based on the location information that there are no permitted areas nearby the current location of the shared machine 130, which has been determined (at 620) to correspond to a non-permitted area, the method 600 loops back to 610.

When the shared machine location service 126 determines (at 625) based on the location information that there are permitted areas nearby the current location of the shared machine 130, which has been determined (at 620) to correspond to a non-permitted area, the method 600 proceeds to 660. At 660, the shared machine management module 122 can communicate a message to the user device 150 of the user and/or to a communication device that is mounted on and associated with the shared machine 130. The message can include a map that includes the location of the shared machine 130, and a dynamic marking of the non-permitted area it is presently located in and/or permitted areas that are located nearby displayed in conjunction with the map. By displaying the location of the shared machine 130 relative to the non-permitted area that it is located in, the user will have a better idea of how to relocate the shared machine 130 to one of the permitted areas that are nearby even if the user is unfamiliar with the surrounding areas.

At 630, the shared machine management module 122 can generate a command and send it to the shared machine 130 to automatically place a mechanism (associated with the shared machine 130) in a first state so that the operational function of the shared machine 130 is prevented from being enabled while the shared machine 130 remains in the non-permitted area. For example, in one embodiment, the shared machine 130 comprises a control system 230 and a controller, and in response to the command from the controller, the control system 230 can actuate an actuator or other mechanism that allows for an operational function of the shared machine 130 to be controlled (e.g., enabled or disabled) via the control system 230 to prevent an operating mode of the shared machine 130 until the shared machine 130 is moved from the non-permitted area to a permitted area. For example, in one implementation, where the shared machine 130 is a vehicle having one or more wheels, an actuator can control a mechanism (e.g., a lock or a gear) to place it in a state that allows locking or normal movement of the vehicle to be prevented. For instance, wheels of a bike could be placed in a freewheeling mode such that the one or more wheels do not operate in a normal manner.

At 640, the shared machine management module 122 can generate and communicate a message to a user device 150 of the user and/or to a communication device that is mounted on and associated with the shared machine 130. In one embodiment, the message indicates that continued presence of the shared machine 130 in the non-permitted area will result in a cost to the user until the shared machine 130 is moved from the non-permitted area to a permitted area. Depending on the implementation, the permitted area can be an authorized region, a non-regulated zone, a zone where the shared machine is permitted to be stored, or a parking zone where parking or storage of the shared machine is permitted, etc. The cost to the user could be, for example, that the usage timer will continue to run and accumulate usage fees that will be charged to the user; a reduced credit score credit score; a monetary penalty or fine; and/or loss of future usage of a shared machine service, etc.

For example, in one embodiment, when the location corresponds to the non-permitted area, a communication device can receive a communication that causes a signal to be presented via a user interface of the communication device. For instance, the signal can provide an indication that the shared machine 130 is in the non-permitted area. The signal can be in the form of an audible signal and/or a visual signal. The signal can indicate that the shared machine 130 has to be moved from the location into a permitted area before the operational function of the shared machine 130 will be enabled, and costs will no longer incurred.

At 650, the shared machine management module 122 can create a record of an operational violation that indicates that the shared machine 130 is or has been within the non-permitted area. The record can include the duration of time that the shared machine 130 was left within the non-permitted area, an identifier for the shared machine 130, an identifier for the user and/or account who was using the shared machine.

Following 630, 640, 650, or 660, the method 600 loops back to 610 so that the shared machine location service 126 can continue to monitor the location of the shared machine 130.

The disclosed embodiments can help to ensure or create incentives so that users comply with rules regarding where shared machines can be parked, returned, stored, carried or docked, etc. The disclosed embodiments can help encourage users to make sure that their shared machine is not parked or docked in non-permitted areas where they are not intended to be parked or docked.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for monitoring location of a shared bicycle upon receiving an indication that the shared bicycle has been rented by a user, the system comprising:
   a positioning system configured to generate location information that indicates a location of the shared bicycle, wherein the location information comprises coordinates of the shared bicycle; and
   a server system associated with the shared bicycle, and comprising one or more processors configured by programming instructions encoded on a non-transitory computer readable media such that the server system is configured to:
   process location information that indicates a location of the shared bicycle to determine, based on map data from a map service and the coordinates of the shared bicycle, whether the coordinates of the shared bicycle correspond to a non-permitted area;
   generate, when the location corresponds to the non-permitted area, a command to automatically place a mechanism of the shared bicycle in a first state so that an operational function of the shared bicycle is prevented from being enabled while the shared bicycle remains in the non-permitted area; and
   communicate, when the coordinates of the bicycle are determined to correspond to one of the non-permitted areas, a message to a user device associated with the shared bicycle, wherein the message indicates that continued presence of the shared bicycle in the non-permitted area will result in a cost to the user, wherein the cost to the user includes a monetary penalty.

2. The system according to claim 1, wherein the shared bicycle comprises:
   a control system; and
   a controller configured to generate, in response to the command, a control signal that is provided to the control system, wherein the control system is configured to control an operational function of the mechanism to prevent an operating mode of the shared bicycle.

3. The system according to claim 1, wherein the cost to the user further comprises one or more of a reduced credit score and loss of a privilege to use shared bicycles for a time period.

4. The system according to claim 1, wherein the user device comprises:
an output device comprising: a user interface configured to generate a signal when the location corresponds to a non-permitted area,
wherein the signal provides an indication that the shared bicycle is in the non-permitted area and that the shared bicycle has to be moved from the location into a permitted area before the operational function of the shared bicycle will be enabled.

5. The system according to claim 4, wherein the signal comprises:
a visual signal.

6. The system according to claim 5, wherein the visual signal comprises:
a map that includes the location of the shared bicycle and a dynamic marking of the non-permitted area displayed in conjunction with the map.

7. The system according to claim 1, wherein the shared bicycle comprises wheels, and
wherein placing the mechanism in the first state allows the one or more wheels to enter a freewheeling mode such that the one or more wheels do not operate.

8. The system according to claim 1, wherein the one or more processors are further configured to:
start a usage timer when usage of the shared bicycle starts;
allow the usage timer to continue to run while the location of the shared bicycle remains in the non-permitted area, and start another timer that times a duration that the location of the shared bicycle remains in the non-permitted area;
create a record of an operational violation that indicates that the shared bicycle is within the non-permitted area;
communicate a message to a user device associated with the shared bicycle, wherein the message indicates that continued presence of the shared bicycle in the non-permitted area will result in the cost to the user until the shared bicycle is moved from the non-permitted area to a permitted area; and
stop the usage timer when the shared bicycle is no longer in use and is located in a permitted area.

9. A method for monitoring location of a shared bicycle upon receiving an indication that the shared bicycle has been rented by a user and controlling the shared bicycle, the shared bicycle comprising a mechanism that allows for an operational function of the shared bicycle to be controlled, the method comprising:
generating, via a positioning system, location information that indicates a location of the shared bicycle, wherein the location information comprises coordinates of the shared bicycle;
processing the location information that indicates the location of the shared bicycle, at a server system, to determine, based on map data from a map service and the coordinates of the shared bicycle, whether the coordinates of the shared bicycle correspond to a non-permitted area;
generating a command at the server system, when the location corresponds to a non-permitted area, configured to automatically cause the mechanism to enter in a first state that when entered prevents the operational function of the shared bicycle from being enabled while the shared bicycle remains in the non-permitted area; and
communicating, from the server system when the coordinates of the bicycle are determined to correspond to one of the non-permitted areas, a message to a user device associated with the shared bicycle, wherein the message indicates that continued presence of the shared bicycle in the non-permitted area will result in a cost to the user, wherein the cost to the user includes a monetary penalty.

10. The method according to claim 9, wherein the shared bicycle comprises a control system and a controller, and further comprising:
actuating by the controller, in response to the command from the server system, a control system to prevent an operating mode of the shared bicycle.

11. The method according to claim 9, further comprising:
presenting, at a user interface of the user device associated with the shared bicycle when the location corresponds to the non-permitted area, a signal that provides an indication that the shared bicycle is in the non-permitted area and that the shared bicycle has to be moved from the location into a permitted area before the operational function of the shared bicycle will be enabled.

12. The method according to claim 9, wherein the cost to the user further includes a reduced credit score.

13. The method according to claim 10, wherein the operating mode controls movement of the shared bicycle.

14. A shared bicycle, comprising:
a mechanism configured to control an operational function of the shared bicycle;
a communication interface configured to receive: location information from a positioning system that indicates a location of the shared bicycle when the shared bicycle is rented by a user, wherein the location information comprises coordinates of the shared bicycle, and a command generated when the coordinates of the shared bicycle are determined, based on map data from a map service and the coordinates of the shared bicycle, to correspond to a non-permitted area;
a processor configured by programming instructions encoded on a non-transitory computer readable media to:
generate, in response to the command, control signals to automatically place the mechanism in a state wherein the operational function of the shared bicycle is prevented from being enabled while the shared bicycle remains in the non-permitted area;
receive, from a server system when the coordinates of the shared bicycle are determined to correspond to one of a plurality of the non-permitted areas, a message that indicates that continued presence of the shared bicycle in the non-permitted area will result in a cost to the user, wherein the cost to the user includes a monetary penalty.

* * * * *